3,641,036
DERIVATIVES OF 5-CARBAMOYLOXYMETHYL-3-SUBSTITUTED - 2-OXAZOLIDINONES, PROCESS OF PREPARATION THEREOF AND THEIR THERAPEUTIC APPLICATION

Claude P. Fauran and Guy M. Raynaud, Paris, René A. Oliver, Vincennes, and Colette A. Douzon, Paris, France, assignors to Delalande S.A., Courbevoie, Hauts-de-Seine, France
No Drawing. Filed Mar. 17, 1970, Ser. No. 20,401
Claims priority, application Great Britain, Mar. 18, 1969, 14,260/69
Int. Cl. C07d 85/28
U.S. Cl. 260—268 C    2 Claims

---

ABSTRACT OF THE DISCLOSURE

A compound of the formula

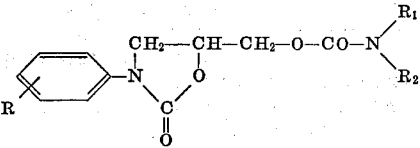

in which R is H, halogen, alkyl having 1 to 4 carbon atoms or trifluoromethyl, and $R_1$ and $R_2$ each is H or dialkylaminoalkyl or together with N comprise methylpiperazino.

The compound is prepared by treating the corresponding 5-hydroxymethyl compound with ammonia or an amine in the presence of phosgene.

The compounds possess anti-depressive, myorelaxing, tranquilizing, sedative, analgesic, anti-convulsive, anti-pyretic, anti-inflammatory and uricosuric activities.

---

This application is related to our application Ser. No. 20,020, filed Mar. 16, 1970.

The present invention concerns novel derivatives of 5-carbamoyloxy-methyl-3-substituted-2-oxazolidinone, their process of preparation and their therapeutic application.

The compounds according to the present invention correspond to the general formula:

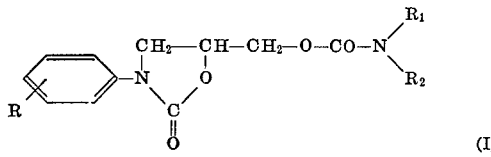

in which:
R is a hydrogen atom, a halogen atom, an alkyl radical having 1 to 4 carbon atoms or a trifluoromethyl radical; and
$R_1$ and $R_2$ each represent a hydrogen atom or a dialkylaminoalkyl radical, or together with the nitrogen atom to which they are attached form a methylpiperazino radical.

The process for the preparation of the compounds according to the present invention comprises treating an oxazolidinone of the general formula:

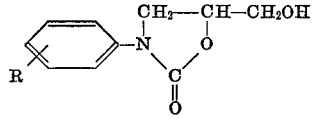

in which R has the same significance as in Formula I, with phosgene in the presence of ammonia or an amine of formula:

in which $R_1$ and $R_2$ have the same significance as in Formula I.

The oxazolidinone of Formula II is prepared by cyclising, by the action of ethyl carbonate, a 1-phenylamino-2,3-propanediol of the general formula:

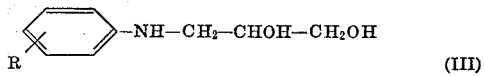

in which R has the same significance as in Formula I.

The following preparation is given, by way of non-limitative example, to illustrate the present invention.

EXAMPLE 5-carbamoyloxymethyl-3-m - trifluoromethylphenyl - 2-oxazolidinone (Code No. 68175).

(1) Preparation of 5 - hydroxymethyl-3-(m-trifluoromethylphenyl)-2-oxazolidinone (Code No. 68121).

59 g. of 1-(m-trifluoromethylphenylamino)-2,3-propanediol and 118 g. of ethyl carbonate are introduced into a distillation apparatus. The mixture is progressively heated to about 110° C. when dissolution is obtained. Then, 12 ml. of 5% solution of sodium methylate in methanol is added thereto. The distillation of the ethanol formed in the course of the reaction is then observed. Upon completion thereof, any excess ethyl carbonate is removed under reduced pressure; the solid residue obtained is crystallised in isopropyl ether.

Melting point=80° C.
Yield=80%.
Empirical formula=$C_{11}H_{10}F_3NO_3$.

Elementary analysis.—Calculated (percent): C, 50.58; H, 3.86; N, 5.36. Found (percent): C, 50.74; H, 3.76; N, 5.56.

(2) Preparation of 5-carbamoyloxymethyl-3-(m-trifluoromethyl phenyl)-2-oxazolidinone.

300 ml. of a 20% solution of phosgene in toluene is rapidly added to a solution of 100 g. of 5-hydroxymethyl-3-(m-trifluoromethylphenyl)-2-oxazolidinone in 250 ml. of benzene. 63 g. of N,N-diethylaniline is then slowly added thereto with agitation. The hydrochloride which precipitates is dried and the clear organic solution also obtained is treated with a rapid current of gaseous ammonia. The solution is then treated with water, decanted and the organic phase is concentrated. The solid residue obtained is crystallised in absolute ethanol.

Melting point=123° C.
Yield=50%.
Empirical formula=$C_{12}H_{11}F_3N_2O_4$.

Elementary analysis.—Calculated (percent): C, 47.37; H, 3.64; N, 9.21. Found (percent): C, 47.50; H, 3.86; N, 9.39.

The following Table I lists a certain number of intermediate compounds of Formula II prepared according to the first part of the above example, and Table II enumerates a certain number of compounds of Formula I prepared according to the second part of the above example.

TABLE I

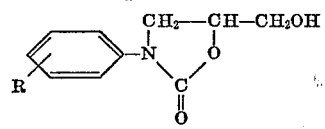

| Code No. | R | Empirical formula | Mol. Wt. | M.P., °C. | Yield, percent | Calculated C | H | N | Found C | H | N |
|---|---|---|---|---|---|---|---|---|---|---|---|
| 67360 | H | C$_{10}$H$_{11}$NO$_3$ | 193.20 | 129 | 75 | 62.16 | 5.74 | 7.25 | 62.20 | 5.87 | 7.40 |
| 68292 | m.F | C$_{10}$H$_{10}$FNO$_3$ | 211.19 | 96 | 87 | 56.87 | 4.77 | 6.63 | 56.88 | 4.92 | 6.79 |
| 69155 | p.F. | C$_{10}$H$_{10}$FNO$_3$ | 211.19 | 116 | 68 | 56.87 | 4.77 | 6.63 | 56.97 | 4.77 | 6.83 |
| 69275 | o.F. | C$_{10}$H$_{10}$FNO$_3$ | 211.19 | 94 | 60 | 56.87 | 4.77 | 6.63 | 56.75 | 4.73 | 6.67 |
| 6922 | p.Cl. | C$_{10}$H$_{10}$ClNO$_3$ | 227.64 | 104 | 55 | 52.75 | 4.43 | 6.15 | 53.01 | 4.53 | 6.05 |
| 69204 | p.CH$_3$ | C$_{11}$H$_{13}$NO$_3$ | 207.22 | 145 | 66 | 63.75 | 6.32 | 6.76 | 63.93 | 6.10 | 6.88 |
| 69276 | m.CH$_3$ | C$_{11}$H$_{13}$NO$_3$ | 207.22 | 76 | 70 | 63.75 | 6.32 | 6.76 | 63.70 | 6.43 | 6.78 |
| 69217 | o.CH$_3$ | C$_{11}$H$_{13}$NO$_3$ | 207.22 | 64 | 69 | 63.75 | 6.32 | 6.76 | 63.71 | 6.37 | 6.88 |

TABLE II

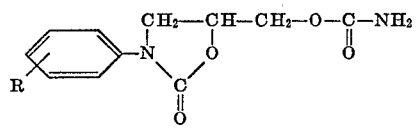

| Code No. | R | Salt | Empirical formula | Mol. wt. | M.P., °C. | Yield, percent | Calculated C | H | N | Cl | Found C | H | N | Cl |
|---|---|---|---|---|---|---|---|---|---|---|---|---|---|---|
| 6878 | H | | C$_{11}$H$_{12}$N$_2$O$_4$ | 236.22 | 130 | 50 | 55.93 | 5.12 | 11.86 | | 55.73 | 5.27 | 11.72 | |
| 6978 | o.CF$_3$ | | C$_{12}$H$_{11}$F$_3$N$_2$O$_4$ | 304.22 | 135 | | 47.37 | 3.64 | 9.21 | | 47.40 | 3.82 | 9.41 | |
| 68291 | m.Cl | | C$_{11}$H$_{11}$Cl N$_2$O$_4$ | 270.67 | 102 | 40 | 48.81 | 4.10 | 10.35 | | 48.80 | 3.88 | 10.22 | |
| 6902 | p.Cl | | C$_{11}$H$_{11}$Cl N$_2$O$_4$ | 270.67 | 120 | 74 | 48.81 | 4.10 | 10.35 | | 49.01 | 4.25 | 10.35 | |
| 6945 | m.Br | | C$_{11}$H$_{11}$Br N$_2$O$_4$ | 315.12 | 132 | 50 | 41.92 | 3.52 | 8.89 | | 42.01 | 3.72 | 9.06 | |
| 6901 | m.F | | C$_{11}$H$_{11}$FN$_2$O$_4$ | 254.21 | 110 | 70 | 51.97 | 4.36 | 11.02 | | 51.93 | 4.44 | 11.13 | |
| 69254 | p.F | | C$_{11}$H$_{11}$FN$_2$O$_4$ | 254.21 | 140 | 60 | 51.97 | 4.36 | 11.02 | | 52.07 | 4.34 | 10.82 | |
| 69263 | o.F | | C$_{11}$H$_{11}$FN$_2$O$_4$ | 254.21 | 80 | 40 | 51.97 | 4.36 | 11.02 | | 52.16 | 4.34 | 10.94 | |
| 69252 | p.CH$_3$ | | C$_{12}$H$_{14}$N$_2$O$_4$ | 250.25 | 148 | 60 | 57.59 | 5.64 | 11.20 | | 57.40 | 5.56 | 11.40 | |
| 59237 | m.CH$_3$ | | C$_{12}$H$_{14}$N$_2$O$_4$ | 250.25 | 105 | 70 | 57.59 | 5.64 | 11.20 | | 57.40 | 5.44 | 11.13 | |
| 69239 | o.CH$_3$ | | C$_{12}$H$_{14}$N$_2$O$_4$ | 250.25 | 126 | 35 | 57.59 | 5.64 | 11.20 | | 57.79 | 5.72 | 11.26 | |

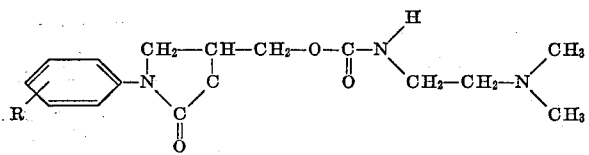

| Code No. | R | Salt | Empirical formula | Mol. wt. | M.P., °C. | Yield, percent | Calculated C | H | N | Cl | Found C | H | N | Cl |
|---|---|---|---|---|---|---|---|---|---|---|---|---|---|---|
| 68327 | H | | C$_{15}$H$_{21}$N$_3$O$_4$ | 307.34 | 77 | 50 | 58.62 | 6.89 | 19.67 | | 59.18 | 7.14 | | |
| | | HCl | C$_{15}$H$_{22}$Cl N$_3$O$_4$ | 343.80 | 168 | 90 | 52.40 | 6.45 | 12.22 | | 52.32 | 6.68 | 12.43 | |
| 6985 | m.CF$_3$ | | C$_{16}$H$_{20}$F$_3$N$_3$O$_4$ | 375.34 | 78 | 40 | 51.20 | 5.37 | 11.20 | | 51.18 | 5.52 | 11.40 | |
| 69253 | m.F | | C$_{15}$H$_{20}$FN$_3$O$_4$ | 325.33 | 78 | 35 | 55.87 | 6.20 | 12.92 | | 55.27 | 6.13 | 12.96 | |
| | | HCl | C$_{15}$H$_{21}$Cl FN$_3$O$_4$ | 361.80 | 140 | | 49.79 | 5.85 | 11.62 | | 49.59 | 5.97 | 11.50 | |

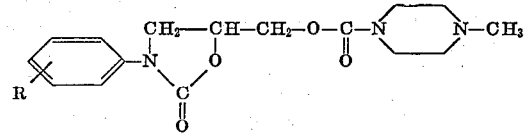

| Code No. | R | Salt | Empirical formula | Mol. wt. | M.P., °C. | Yield, percent | Calculated C | H | N | Cl | Found C | H | N | Cl |
|---|---|---|---|---|---|---|---|---|---|---|---|---|---|---|
| 68306 | H | | C$_{16}$H$_{21}$N$_3$O$_4$ | 319.35 | 70 | 50 | 60.17 | 6.63 | 13.16 | | 59.98 | 6.42 | 13.36 | |
| | | HCl | C$_{16}$H$_{22}$ClN$_3$O$_4$ | 355.82 | 220 | 98 | 54.01 | 6.23 | 11.81 | 9.96 | 53.81 | 6.39 | 11.78 | 10.13 |
| 6989 | m.CF$_3$ | | C$_{17}$H$_{20}$F$_3$N$_3$O$_4$ | 359.34 | 66 | | 52.71 | 5.20 | 10.85 | | 52.71 | 5.33 | 10.76 | |
| | | Maleate | C$_{21}$H$_{24}$F$_3$N$_3$O$_8$ | 503.43 | 120 | 80 | 50.10 | 4.81 | 8.35 | | 49.96 | 5.12 | 8.54 | |
| 69235 | m.F | | C$_{16}$H$_{20}$FN$_3$O$_4$ | 337.34 | 75 | 31 | 56.96 | 5.98 | 12.46 | | 56.77 | 5.79 | 12.58 | |
| | | HCl | C$_{16}$H$_{21}$ FN$_3$O$_4$ | 373.81 | 210 | 40 | 51.41 | 5.66 | 11.24 | | 51.33 | 5.46 | 11.26 | |

The compounds of Formula I experimentally exert anti-depressive, myorelaxing, tranquillising, sedative, analgesic, anti-convulsive, anti-pyretic, anti-inflammatory and uricosuric activities. Moreover, their toxic effects on animals in the laboratory are little marked.

(I)—Anti-depressive properties

The compounds of Formula I are capable of opposing hypothermia and the ptosis provoked by reserpine in the rat and the mouse, as well as the ulcers provoked by reserpine in the rat. Moreover, they oppose the catalepsy provoked by prochlorperazine in the art.

By way of example, several results obtained are listed in the following table:

TABLE III

| Code Number | Hypothermia | | Ptosis | | | | Ulcers | | Catalepsy | |
|---|---|---|---|---|---|---|---|---|---|---|
| | | | Rat | | Mouse | | | | | |
| | Dose[1] | Effect, °C. | Dose[1] | Effect, percent | Dose[1] | Effect, percent | Dose[1] | Effect, percent | Dose[1] | Effect, percent |
| 6878 | 200 | −3.4 | 200 | 53 | 200 | 55 | 200 | 50 | | |
| 68175 | 100 | −4 | | | 100 | 85 | | | | |
| 6901 | 100 | −2.4 | 100 | 50 | 100 | 60 | 100 | 55 | 200 | 35 |
| 68921 | 100 | −3 | 100 | 60 | 100 | 50 | | | | |
| 6902 | 100 | −2.7 | 100 | 45 | 100 | 50 | | | | |
| 6945 | 100 | −2.5 | 100 | 55 | 100 | 45 | | | | |
| 69237 | | | 100 | 45 | 100 | 45 | | | | |
| 69252 | | | 100 | 50 | 100 | 50 | | | | |
| 6985 | 100 | −2 | | | | | | | | |
| 69254 | | | | | 100 | 54 | | | | |
| 69263 | | | | | 100 | 50 | | | | |

[1] Expressed in mg./kg./P.O.

(II)—Myorelaxing properties

The compounds of Formula I provoke in the mouse the loss of the righting reflex and inhibit the traction reflexes and the maintenance on a rotating rod.

By way of example, for the compound No. 68175, the $ED_{50}$ in the traction test and also on the rotating rod is 130 mg./kg./P.O.

(III)—Tranquilising and sedative action

These effects are shown by a diminution of the exploration curosity in the enclosure of an actimetric cage and of escape in an open field. The compounds of Formula I reduce the aggressiveness provoked by the passage of an electric current and lower the body temperature of animals. The narcotic effects of penthiobarbital are equally reinforced.

The results obtained with two compounds of Formula I are listed in the following table:

TABLE IV

| | Actimetric | | Evasion test | | Potentialisation of penthiobarbital | |
|---|---|---|---|---|---|---|
| Code Number | Dose[1] | Effect, percent | Dose[1] | Effect, percent | Dose[1] | Effect, percent |
| 6878 | | | | | 180 | 50 |
| 68175 | 95 | 50 | 200 | 50 | 100 | 60 |

[1] Expressed in mg./kg./P.O.

(IV)—Analgesic activity

This activity is particularly pronounced against the painful stretching provoked in the mouse by the intraperitoneal administration of phenyl benzoquinone or acetic acid.

The results obtained with two compounds of Formula I are shown in the following table:

TABLE V

| | Protection against phenyl benzoquinone | |
|---|---|---|
| Code Number | Dose in mg./kg./P.O. | Effect, percent |
| 68175 | 62 | 60 |
| 6902 | 100 | 40 |

(V)—Anti-convulsive properties

The compounds of Formula I exert in the mouse an antagonism against the lethal effects of cardiazol, strychnine and nicotine. They equally show activity against the tonic hyperextension of an excessive electric shock.

By way of example, the results obtained with several compounds of Formula I are listed in the following table:

TABLE VI

| | Antagonism against— | | | | | | | |
|---|---|---|---|---|---|---|---|---|
| | Cardiazol | | Strychnine | | Nicotine | | Electric shock | |
| Code Number | Dose[1] | Effect, percent | Dose[1] | Effect, percent | Dose[1] | Effect, percent | Dose[1] | Effect, percent |
| 6878 | | | 43 | 50 | | | | |
| 68175 | 90 | 50 | 20 | 50 | 100 | 90 | 100 | 80 |
| 6901 | | | 50 | 90 | | | | |
| 68291 | | | 100 | 100 | 100 | 90 | | |
| 6902 | 100 | 60 | 100 | 100 | 100 | 80 | | |
| 6945 | | | 100 | 100 | 100 | 75 | | |
| 69239 | | | | | 100 | 40 | | |
| 69237 | | | 100 | 80 | | | | |
| 69252 | | | 100 | 80 | | | | |
| 6985 | | | | | 100 | 70 | | |
| 69254 | | | 100 | 100 | 100 | 55 | | |
| 69263 | | | 100 | 90 | | | | |

[1] Expressed in mg./kg./P.O.

(VI)—Anti-pyretic action

This action is manifested by a diminution of the experimental fever provoked by the administration of barm in the cat.

(VII)—Anti-inflammatory effect

The under-planatar oedema provoked in the rat by the administration of carraghenine is diminished by the compounds of the present invention.

The results obtained with two of the compounds of Formula I are shown in the following table:

TABLE VII

| Code Number | Dose in mg./kg./P.O. | Reduction of the oedema, percent |
|---|---|---|
| 68175 | 200 | 65 |
| 68291 | 100 | 40 |

(VIII)—Uricosuric action

After repeated oral administration in the rat, the compounds of Formula I provoke an augmentation of the urinary elimination of uric acid.

In consequence of the results shown above, and the values appearing in the following table, the difference between the pharmacologically-active dose and the lethal dose is sufficiently great to enable the compounds of Formula I to be utilised in therapeutics.

TABLE VIII $L.D._{60}$ P.O. (mouse)

| Code No.: | Mg./kg. |
|---|---|
| 6878 | 2,700 |
| 68175 | 2,100 |
| 6901 | 2,800 |
| 68291 | >3,200 |
| 6902 | 1,500 |
| 6945 | >3,200 |
| 69239 | >4,000 |
| 69237 | 4,000 |
| 69252 | >4,000 |
| 6985 | 1,350 |
| 69254 | 2,500 |
| 69263 | 3,400 |

The compounds of Formula I are indicated in the case of depression and neurosis by depressive and anxious components. They equally possess a favourable effect against contractural and inflammatory pains, with or without hyperthermia.

They may be administered in the form of tablets and gelules containing 50 to 250 mg. of active ingredient.

Hence, according to the present invention there is also provided a therapeutic composition comprising a compound of Formula I toegther with a therapeutically-acceptable carrier.

Several clinical tests to show the activity of the compounds of the present invention are given below:

EXAMPLE 1.—Compound No. 6901

1st observation: Mr. M. aged 46.

An intellectual, working in a scientific field of high precision, this man was affected by a spasmodic stiff neck due to anxious and hypochondriac grounds. He complained of cervical pains which prevented him from keeping his head upright and concentrating on his work. As a result, he became apathetic, depressed and profoundly restless about his future.

Compound No. 6901, in tablet form containing 100 mg. of active ingredient, was administered three times daily for 15 days. The cervical pains disappeared and he was able to hold his head in an upright position. Besides this myorelaxant action, there is equally ascertained a complete sedation of his depressive anxieties.

2nd observation: Mr. Z. aged 55.

Professional and financial worries were provoked by a reactive neurosis, manifesting itself by an important irritability making family life very difficult. He complained as well as obstinate insomnia and particularly of diverse symptoms characterised by extra-systoles and occasionally of paroxysmal tachycardia, of globus epigastrus and of transient intestinal troubles. His hands trembled uncontrollably. He sometimes had autolysis notions.

Compound No. 6901 in tablet form containing 100 mg. of active ingredient, was administered daily for three weeks, brought the subject back to a normal state, his hands no longer trembled, his sleep returned to normal and he no longer suffered from cardiac or digestive troubles. His troubles disappeared and he was able to attack his commercial problems with courage.

EXAMPLE 2.—Compound No. 68175

Observation: Mrs. A. aged 48.

This woman was in a pre-menopause phase. For two years, she complained apart from menstrual troubles, exacerbated nervousness, interior tension sensations and trouble with precordial striction. She also complained of insomnia and a certain pain in the legs in the sleeping position.

Compound No. 68175, in tablet form containing 100 mg. of active ingredient, was administered 3 times a day for 12 days.

The sedative and tranquillising action is rapidly manifested, causing the irritability to disappear as well as the pain and insomnia. Simultaneously, the myorelaxant action was equally evidenced, as shown by the complete disappearance of the interior tension and the pain in the legs. Moreover, her sleep returned to normal.

What we claim is:

1. A compound of the formula in which
R is hydrogen, halogen, alkyl having 1 to 4 carbon atoms or trifluoromethyl, and $R_3$ is $-H_2$, and the pharmaceutically acceptable acid addition salts thereof.

2. A compound as claimed in claim 1, in which R is a chlorine, bromine or fluorine atom.

References Cited

Morrison et al., "Organic Chemistry," Allyn and Bacon, 1959, p. 692.

ALEX MAZEL, Primary Examiner

R. V. RUSH, Assistant Examiner

U.S. Cl. X.R.

260—307 C; 424—250, 272